(12) United States Patent
Canova et al.

(10) Patent No.: US 10,246,632 B2
(45) Date of Patent: Apr. 2, 2019

(54) PROPPANT HAVING AMPHIPHOBIC COATINGS AND METHODS FOR MAKING AND USING SAME

(71) Applicant: CARBO CERAMICS, INC., Houston, TX (US)

(72) Inventors: Steve Canova, Toomsboro, GA (US); Chad Cannan, Houston, TX (US)

(73) Assignee: CARBO CERAMICS INC., Houston, TX (US)

( * ) Notice: Subject to any disclaimer, the term of this patent is extended or adjusted under 35 U.S.C. 154(b) by 0 days.

(21) Appl. No.: 15/336,968

(22) Filed: Oct. 28, 2016

(65) Prior Publication Data

US 2017/0121596 A1    May 4, 2017

Related U.S. Application Data

(60) Provisional application No. 62/248,436, filed on Oct. 30, 2015.

(51) Int. Cl.
*E21B 43/267* (2006.01)
*C09K 8/80* (2006.01)
*E21B 43/26* (2006.01)

(52) U.S. Cl.
CPC .............. *C09K 8/805* (2013.01); *E21B 43/26* (2013.01)

(58) Field of Classification Search
CPC .................................................... C09K 8/805
USPC ....................................................... 166/280.2
See application file for complete search history.

(56) References Cited

U.S. PATENT DOCUMENTS

| | | |
|---|---|---|
| 4,068,718 A | 1/1978 | Cooke, Jr. et al. |
| 4,427,068 A | 1/1984 | Fitzgibbon |
| 4,440,866 A | 4/1984 | Lunghofer et al. |
| 4,993,491 A | 2/1991 | Palmer et al. |
| 5,188,175 A | 2/1993 | Sweet |
| 5,344,903 A | 9/1994 | Raiford et al. |
| 5,798,415 A | 8/1998 | Corpart et al. |
| 5,964,291 A | 10/1999 | Bourne et al. |
| 5,981,614 A | 11/1999 | Adiletta |
| 7,036,591 B2 | 5/2006 | Cannan et al. |
| 7,135,231 B1 | 11/2006 | Sinclair et al. |
| 7,598,209 B2 | 10/2009 | Kaufman et al. |
| 7,968,625 B2 | 6/2011 | 5Awauchi et al. |
| 8,586,184 B2 | 11/2013 | Fukuda et al. |
| 8,865,631 B2 | 10/2014 | Idred et al. |
| 8,883,693 B2 | 11/2014 | Eldred et al. |
| 9,670,400 B2 | 6/2017 | Eldred et al. |
| 2002/0048676 A1* | 4/2002 | McDaniel ............ A63K 1/00 428/404 |
| 2003/0147821 A1 | 8/2003 | Victor |
| 2004/0023818 A1 | 2/2004 | Nguyen et al. |
| 2004/0069490 A1* | 4/2004 | Cannan ................ C09K 8/80 166/280.1 |
| 2005/0002996 A1 | 1/2005 | Sojka |
| 2005/0129759 A1 | 6/2005 | Sojka |
| 2005/0244641 A1 | 11/2005 | Vincent |

(Continued)

*Primary Examiner* — Silvana C Runyan
(74) *Attorney, Agent, or Firm* — Patterson + Sheridan, LLP

(57) ABSTRACT

Proppant having amphiphobic coatings and methods for making and using same are disclosed. The proppant having amphiphobic coatings can include a proppant particle having a size from about 8 mesh to about 140 mesh, density of less than about 4.0 g/cm³, and a coating containing an amphiphobic material formed on an outer surface of the proppant particle.

14 Claims, 1 Drawing Sheet

(56) References Cited

U.S. PATENT DOCUMENTS

| | | | |
|---|---|---|---|
| 2006/0175059 A1* | 8/2006 | Sinclair | C09K 8/805 166/283 |
| 2009/0038797 A1* | 2/2009 | Skala | C09K 8/80 166/280.1 |
| 2010/0167965 A1* | 7/2010 | Sebastian | C09K 8/80 507/230 |
| 2012/0227968 A1 | 9/2012 | Eldred et al. | |
| 2012/0264884 A1* | 10/2012 | Liu | C08F 297/026 525/276 |
| 2014/0190686 A1* | 7/2014 | Cannan | E21B 43/25 166/250.01 |
| 2014/0262247 A1 | 9/2014 | Duenckel et al. | |
| 2016/0017214 A1 | 1/2016 | Eldred et al. | |
| 2016/0032177 A1 | 2/2016 | Howe et al. | |
| 2016/0075941 A1 | 3/2016 | Duenckel et al. | |
| 2017/0145300 A1 | 5/2017 | Lu et al. | |

* cited by examiner

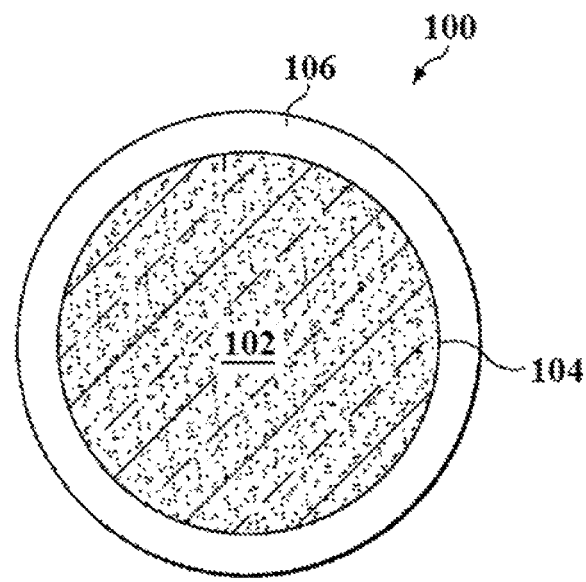

PROPPANT HAVING AMPHIPHOBIC COATINGS AND METHODS FOR MAKING AND USING SAME

CROSS-REFERENCE TO RELATED PATENT APPLICATIONS

This application claims the benefit of U.S. provisional application No. 62/248,436, filed on Oct. 30, 2015, which is incorporated herein by reference in its entirety.

FIELD

Embodiments of the present disclosure relate generally to hydraulic fracturing of geological formations, and more particularly to proppants used in the hydraulic fracture stimulation of oil and gas reservoirs.

BACKGROUND

In order to stimulate and more effectively produce hydrocarbons from downhole formations, especially formations with low porosity and/or low permeability, induced fracturing (called "frac operations", "hydraulic fracturing", or simply "fracing") of the hydrocarbon-bearing formations has been a commonly used technique. In a typical frac operation, fluids are pumped downhole under high pressure, causing the formations to fracture around the borehole, creating high permeability conduits that promote the flow of the hydrocarbons into the borehole. These frac operations can be conducted in horizontal and deviated, as well as vertical, boreholes, and in either intervals of uncased wells, or in cased wells through perforations.

In cased boreholes in vertical wells, for example, the high pressure fluids exit the borehole via perforations through the casing and surrounding cement, and cause the formations to fracture, usually in thin, generally vertical sheet-like fractures in the deeper formations in which oil and gas are commonly found. These induced fractures generally extend laterally a considerable distance out from the wellbore into the surrounding formations, and extend vertically until the fracture reaches a formation that is not easily fractured above and/or below the desired frac interval. The directions of maximum and minimum horizontal stress within the formation determine the azimuthal orientation of the induced fractures. Normally, if the fluid, sometimes called slurry, pumped downhole does not contain solids that remain lodged in the fracture when the fluid pressure is relaxed, then the fracture re-closes, and most of the permeability conduit gain is lost.

These solids, called proppants, are generally composed of sand grains or ceramic particulates, and the fluid used to pump these solids downhole is usually designed to be sufficiently viscous such that the proppant particulates remain entrained in the fluid as it moves downhole and out into the induced fractures. Prior to producing the fractured formations, materials called "breakers" can be pumped downhole in the frac fluid slurry to reduce the viscosity of the frac fluid after a desired time delay to enable these fluids to be removed from the fractures during production.

The proppants can also be placed in the induced fractures with a low viscosity fluid in fracturing operations referred to as "water fracs" or "slick water fracs". The fracturing fluid in water fracs is water with little or no polymer or other additives. Water fracs are advantageous because of the lower cost of the fluid used. Also when using cross-linked polymers, it is essential that the breakers be effective or the fluid cannot be recovered from the fracture, effectively restricting flow of formation fluids and thus reducing fracture permeability. Water fracs, because the fluid is not cross-linked, do not rely on the effectiveness of breakers. However, like the cross-linked polymers, water from the fracturing fluid can accumulate in the fracture, thereby reducing the permeability of gas or oil through the fracture.

The proppant placed into the fracture oftentimes forms a proppant pack permeable to water and/or hydrocarbons produced from the surrounding subterranean formation. Over time, the water and/or hydrocarbon production can lead to deposition of barium sulfate scale, paraffins, waxes and the like onto the proppant pack. This deposition can inhibit fluid flow and reduce well performance by effectively "choking off" the fracture in the area of deposition.

There is a need, therefore, for proppant particulates that promote the return of fracturing fluid and cross-linked polymers to the surface. There is also a need for proppant particulates that can limit deposition of scale, paraffins, waxes, and the like in order to maximize fracture permeability.

SUMMARY

In at least one embodiment, an amphiphobic proppant particle includes a proppant particle having size from about 8 mesh to about 140 mesh and a density of less than about 4.0 g/cm$^3$. The proppant particle includes a coating comprising an amphiphobic material formed on an outer surface of the proppant particle.

BRIEF DESCRIPTION OF THE DRAWINGS

The present disclosure may best be understood by referring to the following description and accompanying drawings that are used to illustrate embodiments of the disclosure. In the drawings:

FIG. 1 is a cross sectional view of a proppant particle containing a proppant particulate and a coating disposed on proppant particulate in accordance with one or more embodiments.

DETAILED DESCRIPTION

In the following description, numerous specific details are set forth. However, it is understood that embodiments of the disclosure may be practiced without these specific details. In other instances, well-known structures and techniques have not been shown in detail in order not to obscure the understanding of this description.

Described herein are proppant compositions having hydrophobic and/or hydrophilic properties. In particular, proppant particulates having an amphiphobic treatment, or coating, are described herein. Also described herein are methods for making proppant having hydrophobic and/or oleophobic properties. In particular, methods of placing an amphiphobic coating onto outer surfaces of the proppant particulates are described herein. Also described herein are methods of using proppant compositions having hydrophobic and/or oleophobic properties. In particular, methods of hydraulic fracturing, frac-packing, and/or gravel packing with proppant particulates having an amphiphobic coating are described herein.

The proppant compositions disclosed herein can be or include amphiphobic proppant. The amphiphobic proppant can have a hydrophobic component and an oleophobic component. For example, the amphiphobic proppant can include a proppant particulate having one or more coatings of a hydrophobic material, one or more coatings of an oleophobic material or any combination thereof. In one or more exemplary embodiments, the proppant particulate is coated with a single coating having both hydrophobic and oleophobic properties.

The hydrophobic component and the oleophobic component of the amphiphobic proppant can be infused into an interconnected porosity of the proppant particulates. For example, the amphiphobic proppant can include a proppant particulate infused and/or coated with a hydrophobic material, an oleophobic material or any combination thereof. In one or more exemplary embodiments, the proppant particulate is infused and/or coated with a single material having both hydrophobic and oleophobic properties.

FIG. 1 is a cross sectional view of a proppant particle 100 containing a proppant particulate 102 having an outer surface 104 and a coating 106 disposed on the outer surface 104 in accordance with one or more embodiments. Coating 106 is an amphiphobic coating in accordance with one or more embodiments.

In one or more exemplary embodiments, the amphiphobic coating can be or include any suitable material, or amphiphobic material, having hydrophobic and/or oleophobic properties. In one or more exemplary embodiments, the amphiphobic material can be or include any suitable material having both hydrophobic and oleophobic properties. In one or more exemplary embodiments, the amphiphobic coating can be or include one or more fluoropolymers. The one or more fluoropolymers can include one or more fluorinated poly(acrylates), one or more fluorinated silanes, one or more fluorinated siloxanes, or any combinations thereof. In one or more exemplary embodiments, the amphiphobic material includes one or more fluorinated poly(acrylates).

In one or more exemplary embodiments, the fluorinated poly(acrylates) can include monomers such as fluorohexyl acrylate, fluoroaryl acrylate, 2-(perfluorooctyl)ethyl acrylate, heptafluorobutyl acrylate, 1H,1H,9H-hexadecafluorononyl acrylate, 2,2,3,4,4,4-hexafluorobutyl acrylate, hexafluoroisopropyl acrylate, 1H,1H,5H-octafluoropentyl acrylate, pentafluorobenzyl acrylate, pentafluorophenyl acrylate, perfluorocyclohexyl methyl acrylate, perfluoroheptoxypoly(propyloxy) acrylate, perfluorooctyl acrylate, 1H,1H-perfluorooctyl acrylate, 2,2,3,3-tetrafluoropropyl acrylate, 2,2,2-trifluoroethyl acrylate, 3-(trifluoromethyl) benzyl acrylate, 2-(N-butylperfluorooctanesulfamido) ethyl acrylate, 1H,1H,7H-dodecafluoroheptyl acrylate, 1H,1H, 11H-eicosafluoroundecyl acrylate, trihydroperfluoroundecyl acrylate, trihydroperfluoroheptyl acrylate, and/or 2-(N-ethylperfluorooctane sulfamido) ethyl acrylate. In one or more exemplary embodiments, the fluorinated poly(acrylates) can include fluorinated polymethacrylates. The fluorinated polymethacrylates can include monomers such as, for example, 2-(perfluorooctyl)ethyl methacrylate (FOEMA), fluorohexyl methacrylate, fluoroaryl methacrylate, 1H,1H, 7H-dodecafluoroheptyl methacrylate, trihydroperfluoroheptyl methacrylate, trihydroperfluoroundecyl methacrylate, 2-(N-ethylperfluorooctane sulfamido) ethyl methacrylate, tetrahydroperfluorodecyl methacrylate, 1H, 1H-heptafluoron-butyl methacrylate, 1H,1H,9H-hexadecafluorononyl methacrylate, 2,2,3,4,4,4-hexafluorobutyl methacrylate, hexafluoroisopropyl urethane of isocyanatoethyl methacrylate, 1H,1H,5H-octafluoropentyl methacrylate, pentafluorobenzyl methacrylate, pentafluorophenyl methacrylate, perfluorocyclohexylmethyl methacrylate, perfluoroheptoxypoly(propyloxy)methacrylate, 1H,1H-perfluorooctyl methacrylate, 2,2,3,3-tetrafluoropropyl methacrylate, 2,2,2-trifluoroethyl methacrylate, 3-(trifluoromethyl)benzyl methacrylate, and/or hexafluoroisopropyl methacrylate.

In one or more exemplary embodiments, the fluorinated poly(acrylates) can include fluorinated polydiacrylates. The fluorinated polydiacrylates can include monomers such as, for example, hexafluoro bisphenol diacrylate, 2,2,3,3,4,4,5, 5-octafluoro-1,6-hexanediol diacrylate, polyperfluoroethylene glycol diacrylate, and/or 2,2,3,3-tetrafluoro-1,4-butanediol diacrylate.

In one or more exemplary embodiments, the fluorinated poly(acrylates) can include fluorinated polydimethacrylates. The fluorinated polydimethacrylates can include monomers such as, for example, hexafluoro bisphenol a dimethacrylate, 2,2,3,3,4,4,5,5-octafluoro-1,6-hexanediol dimethacrylate, perfluorocyclohexyl-1,4-dimethyl dimethacrylate, polyperfluoroethylene glycol dimethacrylate, and/or 2,2,3,3-tetrafluoro-1,4-butanediol dimethacrylate.

The one or more fluorinated poly(acrylates) can be the reaction product of one or more acrylate monomers having a fluorine-containing group. The acrylate monomer having a fluorine-containing group can include a monomer having:
(i) at least one fluorine-containing group selected from the group of a fluoroalkyl group, a fluoroalkenyl group and a fluoroether group, and
(ii) an unsaturated group of the formula:

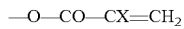

—O—CO—CX=CH$_2$ wherein X is a hydrogen atom, an alkyl group having 1 to 6 carbon atoms, a fluorine atom, a chlorine atom, a bromine atom, an iodine atom, a CFX$^1$X$^2$ group (in which X$^1$ and X$^2$ are independently a hydrogen atom, a fluorine atom, a chlorine atom, a bromine atom or an iodine atom), a cyano group, a linear or branched fluoroalkyl group having 1 to 21 carbon atoms, a substituted or unsubstituted benzyl group, or a substituted or unsubstituted phenyl group.

In one or more exemplary embodiments, the acrylate monomer having the fluorine-containing group is represented by the formula:

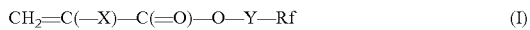

CH$_2$=C(—X)—C(=O)—O—Y—Rf                (I)

wherein X is a hydrogen atom, an alkyl group having 1 to 6 carbon atoms, a fluorine atom, a chlorine atom, a bromine atom, an iodine atom, a CFX$^1$X$^2$ group (in which X$^1$ and X$^2$ are independently a hydrogen atom, a fluorine atom, a chlorine atom, a bromine atom or an iodine atom), a cyano group, a linear or branched fluoroalkyl group having 1 to 21 carbon atoms, a substituted or unsubstituted benzyl group, or a substituted or unsubstituted phenyl group, wherein Y is a direct bond, an aliphatic group having 1 to 10 carbon atoms which optionally has an oxygen atom, an aromatic, cycloaliphatic or aliphatic group having 6 to 10 carbon atoms which optionally has an oxygen atom, a —CH$_2$CH$_2$N(R$^1$) SO$_2$— group (in which R$^1$ is an alkyl group having 1 to 4 carbon atoms) or a —CH$_2$CH(OY$^1$)CH$_2$— group (in which Y$^1$ is a hydrogen atom or an acetyl group), and wherein Rf is a linear or branched fluoroalkyl group having 1 to 7 carbon atoms, a linear or branched fluoroalkenyl group having 2 to 7 carbon atoms, or a fluoroether group having totally 1 to 200 repeating units selected from the group of the repeating units: —C$_3$F$_6$O—, —C$_2$F$_4$O— and —CF$_2$O—.

When the Rf group in the formula (I) is a fluoroalkyl group, the Rf group can include —CF$_3$, —CF$_2$CF$_3$, —CF$_2$CF$_2$CF$_3$, —CF(CF$_3$)$_2$, —CF$_2$CF$_2$CF$_2$CF$_3$, —CF$_2$CF (CF$_3$)$_2$, —C(CF$_3$)$_3$, —(CF$_2$)$_4$CF$_3$, —(CF$_2$)$_2$CF(CF$_3$)$_2$, —CF$_2$C(CF$_3$)$_3$, —CF(CF$_3$)CF$_2$CF$_2$CF$_3$, (CF$_2$)$_5$CF$_3$, —(CF$_2$)$_3$CF(CF$_3$)$_2$, —(CF$_2$)$_4$CF(CF$_3$)$_2$, —(CF$_2$)$_2$H, —CF$_2$CFHCF$_3$, —(CF$_2$)$_4$H and —(CF$_2$)$_6$H. When the Rf group is the fluoroalkyl group, the carbon atom number of the Rf group can be from 1 to 7, from 2 to 6, or from 4 to 6.

When the Rf group in the formula (I) is the fluoroalkenyl group, the Rf group can include —CF═CF(CF$_3$), —CF═C(CF$_3$)$_2$, —CF═C(CF$_3$)(CF$_2$CF$_2$CF$_3$), —CF═C(CF$_3$)(CF(CF$_3$)$_2$), —C(CF$_3$)═CF(CF(CF$_3$)$_2$) and —C(CF$_2$CF$_3$)═C(CF$_3$)$_2$. When the Rf group is the fluoroalkenyl group, the carbon atom number of the Rf group can be from 2 to 7 or from 3 to 6.

When the Rf group in the formula (I) is the fluoroether group, the Rf group has at least one type of repeating unit (oxyperfluoroalkylene group) selected from the group of —C$_3$F$_6$O—, —C$_2$F$_4$O— and —CF$_2$O—. The total number of oxyperfluoroalkylene repeating units can be from 1 to 200, from 1 to 100, or from 5 to 50. The fluoroether group can have an end group directly bonding to the oxyperfluoroalkylene repeating unit. Examples of the end group include a hydrogen atom, a halogen atom (for example, a fluorine atom), an alcohol group (for example, HOCH$_2$—), an epoxy group, an amine group (for example, H$_2$N—), a carboxylic acid group (for example, HOOC—), an acid halide group (for example, F(O═)C—) and a chloromethyl group (ClH$_2$C—). The fluoroether group can have a fluoroalkylene group having 1 to 10 (preferably 1 to 3) carbon atoms, particularly a perfluoroalkylene group, in addition to the oxyperfluoroalkylene repeating unit and the end group. Examples of the fluoroalkylene group having 1 to 10 carbon atoms include —CF$_2$— and —CF$_2$CF$_2$—.

Y in the formula (I) is an aliphatic group having 1 to 10 carbon atoms. The aliphatic group can be an alkylene group having 1 to 4 carbon atoms.

In other exemplary embodiments, the acrylate monomer having a fluorine-containing group can be or include the following: Rf—(CH$_2$)$_{10}$OCOCH═CH$_2$, Rf(CH$_2$)$_{10}$OCOC(CH$_3$)═CH$_2$, Rf—CH$_2$OCOCH═CH$_2$, Rf—CH$_2$OCOC(CH$_3$)═CH$_2$, Rf—(CH$_2$)$_2$OCOCH═CH$_2$, Rf—(CH$_2$)$_2$OCOC(CH$_3$)═CH$_2$, Rf—SO$_2$N(CH$_3$)(CH$_2$)$_2$OCOCH═CH$_2$, Rf—SO$_2$N(C$_2$H$_5$)(CH$_2$)$_2$OCOCH═CH$_2$, Rf—CH$_2$CH(OCOCH$_3$)CH$_2$OCOC(CH$_3$)═CH$_2$, Rf—CH$_2$CH(OH)CH$_2$OCOCH═CH$_2$.

In one or more exemplary embodiments, the one or more fluoropolymers can include one or more fluorinated poly(acrylates) based on the structural unit C$_6$F$_{13}$CH═CHROCOCH═CH$_2$. For example, the one or more fluoropolymers can include one or more fluorinated poly(acrylates) containing a combination of repeating units derived from the monomer C$_6$F$_{13}$CH═CHROCOCH═CH$_2$, wherein R is selected from the group of CH$_2$, CH$_2$OCH$_2$CH$_2$, and (OCH$_2$CH$_2$CH$_2$)$_{1-6}$.

In one or more exemplary embodiments, the one or more fluoropolymers can be in the form of an aqueous fluoropolymer dispersion. The fluoropolymer dispersion can include a liquid medium, namely water, or a mixture of water with a water-soluble organic solvent. The water-soluble organic solvent can include an alcohol such as methanol, ethanol, n-propanol and isopropanol; and a ketone such as acetone. The fluoropolymer dispersion can include the fluoropolymer in any suitable amounts. In one or more exemplary embodiments, the fluoropolymer dispersion can have a fluoropolymer concentration of about 1 wt %, about 4 wt %, about 6 wt %, about 8 wt %, about 10 wt % to about 12 wt %, about 15 wt %, about 20 wt %, about 30 wt %, about 40 wt %, or about 50 wt % or more. In one or more exemplary embodiments, the fluoropolymer dispersion can have a water concentration of about 50 wt %, about 60 wt %, about 70 wt %, about 80 wt %, about 85 wt %, or about 88 wt % to about 90 wt %, about 92 wt %, about 94 wt %, about 96 wt %, or about 99 wt % or more. In one or more embodiments, the fluoropolymer dispersion can have a water-soluble organic solvent concentration of about 0.01 wt %, about 0.05 wt %, about 0.1 wt %, about 1 wt %, or about 2 wt % to about 4 wt %, about 8 wt %, or about 12 wt % or more.

In one or more exemplary embodiments, the fluoropolymer dispersion can be or include UNIDYNE™ TG-5601, UNIDYNE™ TG-5541, UNIDYNE™ TG-5543, UNIDYNE™ TG-5502, or UNIDYNE™ TG-8111, each commercially available from Daikin Industries, Ltd. In one or more exemplary embodiments, the fluoropolymer dispersion can be or include STAINGUARD-WB™, commercially available from Chemical Products Industries, Inc. The amphiphobic coating can be or include any suitable coating or material disclosed in U.S. Pat. Nos. 5,344,903, 5,798,415, 5,981,614, 7,968,625, and 8,586,184, each of which are incorporated by reference herein in its entirety.

The amphiphobic material can include silicon containing compounds, including silicone materials and siloxanes, polytetrafluoroethylene (commonly known as Teflon™), plant oils, such as linseed oil, soybean oil, corn oil, cottonseed oil, vegetable oil (widely commercially available such as Crisco™), and canola oil, and hydrocarbons such as kerosene, diesel, and crude oil, petroleum distillates such as hydrocarbon liquids comprising a mixture of C$_7$-C$_{12}$ aliphatic and alicyclic hydrocarbons and aromatic hydrocarbons (C$_7$-C$_{12}$), commonly known as Stoddard Solvent, aliphatic solvents, solvent naphtha (medium aliphatic and light aromatic), and paraffin, such as solvent dewaxed heavy paraffinic petroleum distillate. One such material according to the present disclosure may be generally described as a silicon containing compound. In certain embodiments of the present disclosure, the silicon containing compound is a siloxane based on the structural unit —R$_2$SiO—, wherein R is an alkyl group. In other certain embodiments of the present disclosure, the silicon containing compound is a nonvolatile linear siloxane represented by the formula:

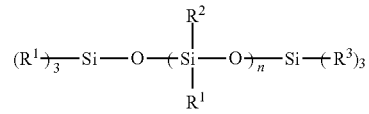

where (R$^1$) is an alkyl group having from one to three carbon atoms, (R$^2$) is either a hydrogen atom or an alkyl group having from one to three carbon atoms, (R$^3$) is an alkyl group having from one to four carbon atoms and n is a number between about 50 and about 200. In still other certain embodiments of the present disclosure, the suitable silicon containing compounds include polymethylhydrogen siloxane and polydimethyl siloxane.

The proppant particulate can be or include any suitable particulate, including ceramic proppant, sand, resin coated sand, plastic beads, glass beads, and other ceramic or resin coated proppants. In one or more exemplary embodiments, the proppant particulate can be or include natural sand. In one or more exemplary embodiments, the proppant particulate can be or include ceramic proppant. The ceramic proppant can be or include porous ceramic proppant and non-porous ceramic proppant. Such proppant particulates can be manufactured according to any suitable process including, but not limited to continuous spray atomization, spray fluidization, drip casting, spray drying, or compression. Suitable proppant particulates and methods for manufacture are disclosed in U.S. Pat. Nos. 4,068,718, 4,427,068, 4,440,866, 5,188,175, 7,036,591, 8,865,631, 8,883,693, and 9,670,400 and U.S. Patent Application Publication Nos. 2012/0227968 and 2016/0017214, the entire disclosures of which are incorporated herein by reference, the entire disclosures of which are incorporated herein by reference.

The proppant particulate can be or include silica, alumina, alumino silicates, or magnesium alumino silicates or any combination thereof. The proppant particulate can be or include silica and/or alumina in any suitable amounts. According to several exemplary embodiments, the proppant particulate includes less than 80 wt %, less than 60 wt %, less than 40 wt %, less than 30 wt %, less than 20 wt %, less than 10 wt %, or less than 5 wt % silica based on the total weight of the proppant particulate. According to several exemplary embodiments, the proppant particulate includes from about 0.1 wt % to about 70 wt % silica, from about 1 wt % to about 60 wt % silica, from about 2.5 wt % to about 50 wt % silica, from about 5 wt % to about 40 wt % silica, or from about 10 wt % to about 30 wt % silica. According to several exemplary embodiments, the proppant particulate includes at least about 30 wt %, at least about 50 wt %, at least about 60 wt %, at least about 70 wt %, at least about 80 wt %, at least about 90 wt %, or at least about 95 wt % alumina based on the total weight of the proppant particulate. According to several exemplary embodiments, the proppant particulate includes from about 30 wt % to about 99.9 wt % alumina, from about 40 wt % to about 99 wt % alumina, from about 50 wt % to about 97 wt % alumina, from about 60 wt % to about 95 wt % alumina, or from about 70 wt % to about 90 wt % alumina.

According to several exemplary embodiments, the proppant compositions disclosed herein include proppant particulates that are substantially round and spherical having a size in a range between about 6 and about 270 U.S. Mesh. For example, the size of the proppant particulate can be expressed as a grain fineness number (GFN) in a range of from about 15 to about 300, or from about 30 to about 110, or from about 40 to about 70. According to such examples, a sample of proppant particulates can be screened in a laboratory for separation by size, for example, intermediate sizes between 20, 30, 40, 50, 70, 100, 140, 200, and 270 U.S. mesh sizes to determine GFN. The correlation between sieve size and GFN can be determined according to Procedure 106-87-S of the American Foundry Society Mold and Core Test Handbook, which is known to those of ordinary skill in the art.

The proppant particulates can have any suitable size. For example, the proppant particulate can have a mesh size of at least about 6 mesh, at least about 10 mesh, at least about 14 mesh, or at least about 20 mesh. According to several exemplary embodiments, the proppant particulate has a mesh size from about 8 mesh, about 10 mesh, about 14 mesh, or about 20 mesh to about 25 mesh, about 30 mesh, about 35 mesh, about 40 mesh, about 45 mesh, about 50 mesh, about 70 mesh, about 100 mesh, about 120 mesh, or about 140 mesh. According to several exemplary embodiments, the proppant particulate has a mesh size from about 20 mesh to about 40 mesh, from about 16 mesh to about 20 mesh, from about 16 mesh to about 30 mesh, from about 30 mesh to about 50 mesh, from about 40 mesh to about 70 mesh, or from about 50 mesh to about 140 mesh.

According to several exemplary embodiments, the proppant compositions disclosed herein include porous and/or non-porous proppant particulates having any suitable permeability and conductivity in accordance with ISO 13503-5: "Procedures for Measuring the Long-term Conductivity of Proppants," and expressed in terms of Darcy units, or Darcies (D). A pack of the proppant particulates, having a 20/40 mesh size range, can have a long term permeability at 7,500 psi of at least about 1 D, at least about 2 D, at least about 5 D, at least about 10 D, at least about 20 D, at least about 40 D, at least about 80 D, at least about 120 D, at least about 150 D, at least about 200 D, or at least about 250 D. The pack of the proppant particulates, having a 20/40 mesh size range, can have a long term permeability at 12,000 psi of at least about 1 D, at least about 2 D, at least about 3 D, at least about 4 D, at least about 5 D, at least about 10 D, at least about 25 D, at least about 50 D, at least about 100 D, at least about 150 D, or at least about 200 D. The pack of the proppant particulates, having a 20/40 mesh size range, can have a long term permeability at 15,000 psi of at least about 1 D, at least about 2 D, at least about 3 D, at least about 4 D, at least about 5 D, at least about 10 D, at least about 25 D, at least about 50 D, at least about 75 D, at least about 100 D, or at least about 150 D. The pack of the proppant particulates, having a 20/40 mesh size range, can have a long term permeability at 20,000 psi of at least about 1 D, at least about 2 D, at least about 3 D, at least about 4 D, at least about 5 D, at least about 10 D, at least about 25 D, at least about 50 D, at least about 75 D, or at least about 100 D.

A pack of the proppant particulates can have a long term conductivity at 7,500 psi of at least about 100 millidarcy-feet (mD-ft), at least about 200 mD-ft, at least about 300 mD-ft, at least about 500 mD-ft, at least about 1,000 mD-ft, at least about 1,500 mD-ft, at least about 2,000 mD-ft, or at least about 2,500 mD-ft. For example, a pack of the proppant particulates can have a long term conductivity at 12,000 psi of at least about 50 mD-ft, at least about 100 mD-ft, at least about 200 mD-ft, at least about 300 mD-ft, at least about 500 mD-ft, at least about 1,000 mD-ft, or at least about 1,500 mD-ft.

The proppant compositions disclosed herein include proppant particulates having any suitable shape. The proppant particulates can be substantially round, cylindrical, square, rectangular, elliptical, oval, egg-shaped, or pill-shaped. In one or more exemplary embodiments, the proppant particulates are substantially round and spherical. According to several exemplary embodiments, the proppant particulates of the proppant compositions disclosed herein have a density of less than 4.0 g/cm$^3$, less than 3.5 g/cm$^3$, less than 3.0 g/cm$^3$, less than 2.8 g/cm$^3$, or less than 2.5 g/cm$^3$, less than 2.25 g/cm$^3$, less than 2 g/cm$^3$, less than 1.75 g/cm$^3$, or less than 1.5 g/cm$^3$. According to several exemplary embodiments, the proppant particulates have a density of from about 2.5 g/cm$^3$ to about 4.0 g/cm$^3$, from about 2.7 g/cm$^3$ to about 3.8 g/cm$^3$, from about 3.5 g/cm$^3$ to about 4.2 g/cm$^3$, from about 3.8 g/cm$^3$ to about 4.4 g/cm$^3$, from about 3.0 g/cm$^3$ to about 3.5 g/cm$^3$, from about 3.1 g/cm$^3$ to 3.4 g/cm$^3$, from about 1.5 to about 2.2 g/cm$^3$, from about 1.9 to about 2.5 g/cm$^3$, or from about 2.6 to about 3.2 g/cm$^3$.

The proppant particulates can have any suitable bulk density. In one or more exemplary embodiments, the proppant particulates have a bulk density of less than about 3 g/cm$^3$, less than about 2.5 g/cm$^3$, less than about 2.2 g/cm$^3$, less than about 2 g/cm$^3$, less than about 1.8 g/cm$^3$, less than about 1.6 g/cm$^3$, or less than about 1.5 g/cm$^3$. The proppant particulates can have a bulk density of about 1 g/cm$^3$, about 1.15 g/cm$^3$, about 1.25 g/cm$^3$, about 1.35 g/cm$^3$, or about 1.45 g/cm³ to about 1.5 g/cm³, about 1.6 g/cm³, about 1.75 g/cm³, about 1.9 g/cm³, or about 2.1 g/cm³ or more. For example, the proppant particulates can have a bulk density of about 1.3 g/cm³ to about 1.8 g/cm³, about 1.35 g/cm³ to about 1.65 g/cm³, about 1.7 g/cm³ to about 1.9 g/cm³, about 1.9 g/cm³ to about 2.7 g/cm³, or about 1.5 g/cm³ to about 1.9 g/cm³.

The proppant particulates can have any suitable porosity. For example, the proppant particulates can have an internal interconnected porosity from about 1%, about 2%, about 4%, about 6%, about 8%, about 10%, about 12%, or about 14% to about 18%, about 20%, about 22%, about 24%, about 26%, about 28%, about 30%, about 34%, about 38%, about 45%, about 55%, about 65%, or about 75% or more. In several exemplary embodiments, the internal interconnected porosity of the proppant particulates is from about 5% to about 75%, about 5% to about 15%, about 10% to about 30%, about 15% to about 35%, about 25% to about 45%, about 30% to about 55%, or about 35% to about 70%. According to several exemplary embodiments, the proppant particulates can have any suitable average pore size. For example, each proppant particulate can have an average pore size from about 2 nm, about 10 nm, about 15 nm, about 55 nm, about 110 nm, about 520 nm, or about 1,100 to about 2,200 nm, about 5,500 nm, about 11,000 nm, about 17,000 nm, or about 25,000 nm or more in its largest dimension. For example, the proppant particulate can have an average pore size can be from about 3 nm to about 30,000 nm, about 30 nm to about 18,000 nm, about 200 nm to about 9,000, about 350 nm to about 4,500 nm, or about 850 nm to about 1,800 nm in its largest dimension.

The amphiphobic coating on the proppant particulate can have any suitable thickness. In one or more exemplary embodiments, the coating of amphiphobic material can have an average thickness ranging from about 1 nm, about 5 nm, about 15 nm, about 25 nm, about 50 nm, or about 100 nm to about 200 nm, about 400 nm, about 500 nm, about 750 nm, about 1,000 about 1,500 nm, about 2,000 nm, or about 5,000 nm.

The amphiphobic coating can at least partially penetrate any pores in the proppant. For example, the amphiphobic material can be at least partially infused into any internal interconnected porosity of the proppant particulate. The term "internal interconnected porosity," as used herein, means a percentage of the pore volume, or void volume space, over the total volume of a porous ceramic particulate. Methods for infusing porous particulates with chemical treatment agents are well known to those of ordinary skill in the art, such as those disclosed in U.S. Pat. No. 5,964,291 and U.S. Pat. No. 7,598,209, the entire disclosures of which are incorporated herein by reference. In one or more exemplary embodiments, the amphiphobic material can be at least partially coated on the interior walls of pores contained in the proppant particulate.

In one or more exemplary embodiments, the amphiphobic material can be blended with or mixed with a polymeric material that can be coated on the outer surface of the proppant particulate and/or infused into the internal interconnected porosity of the proppant particulate. According to several exemplary embodiments, the proppant particulates can be coated and/or infused with a polymeric material that is substantially non-degradable in the presence of the well fluids but permits the amphiphobic material that is mixed with or blended with the polymeric material to leach, elute, diffuse, bleed, discharge, desorb, dissolve, drain, seep, and leak through the polymeric material so as to release the amphiphobic material onto surfaces of the proppant particulates and into the fracture or well area. The term "degradable," as used herein, means the ability of a chemical or coating to react, to dissolve or breakdown into smaller components under one or more downhole conditions. The amount and molecular weight of the semi-permeable substantially non-degradable polymeric material can be varied to provide for longer or shorter release times for tailored release of the amphiphobic material. According to several exemplary embodiments, the semi-permeable substantially non-degradable polymeric material can include phenol formaldehyde, polyurethane, cellulose ester, polyamides, vinyl esters, epoxies, or combinations thereof.

According to several exemplary embodiments, the proppant particulates can be coated and/or infused with a polymeric material that forms a non-permeable polymeric coating that is substantially degradable in the presence of well fluids. The term "infuse," as used herein, means to inject, attach, introduce, or otherwise include a material into a porous substrate, such as a porous proppant particle. As the degradable coating degrades, the amphiphobic material that is mixed with or blended with the polymeric material can begin to leach, elute, diffuse, bleed, discharge, desorb, dissolve, drain, seep, and leak through the polymeric material so as to release the amphiphobic material onto surfaces of the proppant particulates and into the fracture or well area. The amount and molecular weight of the degradable material can be varied to provide for longer or shorter degrade times and tailored release of the amphiphobic material.

The degradable material can include one or more of water-soluble polymers and cross-linkable water-soluble polymers. Suitable water-soluble polymers and cross-linkable water-soluble polymers are disclosed in U.S. Pat. No. 6,279,656, the entire disclosure of which is incorporated herein by reference. According to several exemplary embodiments in which the degradable coating includes one or more of water-soluble polymers and cross-linkable water-soluble polymers, the solubility parameters of such polymers can be controlled to adjust the timing of the solubility or degradation of the coating. Such parameters can include molecular weight, the hydrophilic/lipophilic balance of the polymers, and the extent of cross-linking of the polymers. According to several exemplary embodiments, the degradable coating includes a degradable polymer such as polylactic acid, cellulose acetate, methyl cellulose or combinations thereof that can degrade inside the hydraulic fracture to allow for the release of the infused amphiphobic material at different time intervals.

An encapsulated proppant particulate containing one or more amphiphobic materials is also disclosed herein. In one or more exemplary embodiments, the encapsulated proppant particulate can include a amphiphobic material containing proppant particulate that is coated or encapsulated with a degradable outer coating, layer, or shell. This degradable outer shell, or degradable shell, can temporarily isolate the amphiphobic material containing proppant particulate from a surrounding fluid, such as a fracturing fluid, to prevent premature release of the amphiphobic material into the fracturing fluid, for example.

The degradable shell can be or include any material suitable to prevent or eliminate separation or release of the amphiphobic material from the encapsulated proppant until the degradable shell degrades or breaks down. For example, the degradable shell can be impermeable or substantially impermeable to fracturing fluids, reservoir fluids, or the like until the degradable shell degrades to a point that it becomes permeable to the surrounding fluid(s). Once the degradable shell becomes fluid permeable, the amphiphobic material can separate or elute from the encapsulated proppant.

The degradable shell can be or include any water soluble and/or hydrocarbon soluble material. In one or more exemplary embodiments, the degradable shell can be or include the encapsulation materials and/or sustained release compositions described in any one of U.S. Pre-Grant Publication Nos. 2003/0147821, 2005/0002996 and 2005/0129759, each incorporated by reference herein in its entirety. In one or more exemplary embodiments, the degradable shell can be or include fatty alcohols that include, but are not limited to, behenyl alcohol, caprylic alcohol, cetyl alcohol, cetaryl alcohol, decyl alcohol, lauryl alcohol, isocetyl alcohol, myristyl alcohol, oleyl alcohol, stearyl alcohol, tallow alcohol, steareth-2, ceteth-1, cetearth-3, and laureth-2. The degradable shell can also be or include C8-C20 fatty acids that include, but are not limited to, stearic acid, capric acid, behenic acid, caprylic acid, lauric acid, myristic acid, tallow acid, oleic acid, palmitic acid, and isostearic acid. The degradable shell can also be or include sorbitan derivatives that include, but are not limited to, PEG-10 sorbitan laurate, PEG-20 sorbitan isostearate, PEG-3 sorbitan oleate, polysorbate 40, sorbitan stearate, and sorbitan palmitate. The degradable shell can also be or include one or more waxes that include, but are not limited to, mink wax, montan wax, carnauba wax, and candelilla wax, and synthetic waxes, such as silicone waxes. In one or more exemplary embodiments, the degradable shell can be selected from polyoxymethylene urea (PMU), methoxymethyl methylol melamine (MMM), polysaccharides, collagens, gelatins, alginates, guar, guar gum, gum Arabic, and agar and any combination or mixture thereof. The degradable shell can also be or include any suitable thermoplastic material. In one or more exemplary embodiments, the degradable shell can be selected from polyvinyl alcohol, poly(acrylates and methacrylates), polylactic acid, polyamides, polyethylene, polypropylene, polystyrene, water-soluble polymers, and crosslinkable water-soluble polymers and any combination thereof.

In one or more exemplary embodiments, the degradable shell can be a thermoplastic material that degrades at any suitable time and temperature. For example, the thermoplastic material can degrade at temperatures of at least about 5° C., at least about 10° C., at least about 20° C., at least about 30° C., at least about 50° C., at least about 70° C., or at least about 90° C. The thermoplastic material can also degrade at temperatures of less than about 100° C., less than about 95° C., less than about 90° C., less than about 80° C., or less than about 70° C. The thermoplastic material can also degrade at temperatures of from about 1° C., about 4° C., about 8° C., about 12° C., about 16° C., about 25° C., about 35° C., about 45° C., or about 55° C. to about 75° C., about 85° C., about 95° C., about 105° C., about 120° C., about 150° C., or about 200° C. or more. In one or more exemplary embodiments, the thermoplastic material can degrade at temperatures of from about 1° C., about 4° C., about 8° C., about 12° C., about 16° C., about 25° C., about 35° C., about 45° C., or about 55° C. to about 75° C., about 85° C., about 95° C., about 105° C., about 120° C., about 150° C., or about 200° C. or more within a time period ranging from about 10 seconds, about 30 seconds, about 1 minute, about 2 minutes, about 5 minutes, about 10 minutes, about 30 minutes, about 1 hour, or about 2 hours to about 5 hours, about 10 hours, about 25 hours, about 50 hours, about 100 hours, about 500 hours, or about 1,000 hours, or about 1,000 hours or more.

The degradable shell can prevent the leaching, elution, diffusion, bleeding, discharging, desorption, dissolution, draining, seeping, or leaking of the amphiphobic material from the non-degraded encapsulated proppant, or encapsulated proppant particulates. According to one or more exemplary embodiments, the amphiphobic material can leach, elute, diffuse, bleed, discharge, desorb, dissolve, drain, seep, or leak from the encapsulated proppant particulates at a rate of less than about 10 ppm/(gram*day), less than about 5 ppm/(gram*day), less than about 2 ppm/(gram*day), less than about 1 ppm/(gram*day), less than about 0.5 ppm/(gram*day), less than about 0.1 ppm/(gram*day), or less than about 0.05 ppm/(gram*day) for at least about 1 hour, at least about 2 hours, at least about 6 hours, at least about 12 hours, at least about 1 day, or at least about 2 days after being admixed with a hydraulic fracturing fluid. According to one or more exemplary embodiments, the amphiphobic material can leach, elute, diffuse, bleed, discharge, desorb, dissolve, drain, seep, or leak from the encapsulated proppant particulates at a rate of less than about 10 ppm/(gram*day), less than about 5 ppm/(gram*day), less than about 2 ppm/(gram*day), less than about 1 ppm/(gram*day), less than about 0.5 ppm/(gram*day), less than about 0.1 ppm/(gram*day), or less than about 0.05 ppm/(gram*day) for at least about 1 hour, at least about 2 hours, at least about 6 hours, at least about 12 hours, at least about 1 day, or at least about 2 days after contacting a subterranean formation. For example, the degradable shell can limit the amount of leaching, elution, diffusion, bleeding, discharging, desorption, dissolution, draining, seeping, or leaking of the amphiphobic material from the encapsulated proppant particulates to less than about 10 ppm/gram, less than less than about 5 ppm/gram, less than about 1 ppm/gram, less than about 0.5 ppm/gram, less than about 0.1 ppm/gram, or less than about 10 ppb/gram for about 10 seconds, about 30 seconds, about 1 minute, about 2 minutes, about 5 minutes, about 10 minutes, about 30 minutes, about 1 hour, or about 2 hours to about 5 hours, about 10 hours, about 25 hours, about 50 hours, about 100 hours, about 500 hours, or about 1,000 hours or more after being admixed with a hydraulic fracturing fluid and/or a gravel-pack fluid. For example, the degradable shell can limit the amount of leaching, elution, diffusion, bleeding, discharging, desorption, dissolution, draining, seeping, or leaking of the amphiphobic material from the encapsulated proppant particulates to less than about 10 ppm/gram, less than less than about 5 ppm/gram, less than about 1 ppm/gram, less than about 0.5 ppm/gram, less than about 0.1 ppm/gram, or less than less than about 10 ppb/gram for about 10 seconds, about 30 seconds, about 1 minute, about 2 minutes, about 5 minutes, about 10 minutes, about 30 minutes, about 1 hour, or about 2 hours to about 5 hours, about 10 hours, about 25 hours, about 50 hours, about 100 hours, about 500 hours, or about 1,000 hours or more after contacting a subterranean formation. In one or more exemplary embodiments, the degradable shell can prevent any leaching, elution, diffusion, bleeding, discharging, desorption, dissolution, draining, seeping, or leaking of the amphiphobic material from the encapsulated proppant particulates after being admixed with a hydraulic fracturing fluid and/or prior to contacting a subterranean formation.

According to several exemplary embodiments, the amphiphobic material is released from the proppant particulates for a period of up to about one year, up to about five years, or up to about ten years after the proppant particulates are placed in a gravel pack region of a wellbore and/or in a fracture in a subterranean formation adjacent to the wellbore.

The amphiphobic material can leach, elute, diffuse, bleed, discharge, desorb, dissolve, drain, seep, or leak from the amphiphobic material containing proppant particulates at any suitable rate. The amphiphobic material can also leach, elute, diffuse, bleed, discharge, desorb, dissolve, drain, seep, or leak from the encapsulated proppant particulates at any suitable rate once the degradable shell becomes fluid permeable. For example, the amphiphobic material can leach, elute, diffuse, bleed, discharge, desorb, dissolve, drain, seep, or leak from the proppant particulates and/or the encapsulated proppant particulates at a rate of at least about 0.1 ppm/(gram*day), at least about 0.3 ppm/(gram*day), at least about 0.7 ppm/(gram*day), at least about 1.25 ppm/(gram*day), at least about 2 ppm/(gram*day), at least about 3 ppm/(gram*day), at least about 5 ppm/(gram*day), at least about 10 ppm/(gram*day), at least about 20 ppm/(gram*day), at least about 40 ppm/(gram*day), at least about 75 ppm/(gram*day), or at least about 100 ppm/(gram*day) for at least about 2 weeks, at least about 1 month, at least about 2 months, at least about 6 months, at least about 9 months, at least about 1 year, or at least about 2 years. For example, the amphiphobic material can elute from the proppant particulates and/or the encapsulated proppant particulates at a rate from about 0.01 ppm/(gram*day), about 0.05 ppm/(gram*day), about 0.1 ppm/(gram*day), about 0.5 ppm/(gram*day), about 1 ppm/(gram*day), about 1.5 ppm/(gram*day), about 2 ppm/(gram*day), or about 3 ppm/(gram*day) to about 4 ppm/(gram*day), about 4.5 ppm/(gram*day), about 5 ppm/(gram*day), about 6 ppm/(gram*day), about 7 ppm/(gram*day), about 8 ppm/(gram*day), about 10 ppm/(gram*day), about 15 ppm/(gram*day), about 30 ppm/(gram*day), about 75 ppm/(gram*day), or about 150 ppm/(gram*day) for at least about 2 weeks, at least about 1 month, at least about 2 months, at least about 6 months, at least about 9 months, at least about 1 year, or at least about 2 years.

The amphiphobic proppant can have an outer surface having any suitable degree of hydrophobicity (water repellency) and/or oleophobicity (oil repellency). In one or more exemplary embodiments, the outer surface of the amphiphobic proppant has a hydrophobicity value as measured by a water droplet contact angle of at least about 90°, at least about 100°, at least about 110°, at least about 120°, at least about 130°, or at least about 150°. In one or more exemplary embodiments, the outer surface of the amphiphobic proppant has an oleophobicity value as measured by an oil droplet contact angle of at least about 90°, at least about 100°, at least about 110°, at least about 120°, at least about 130°, or at least about 150°.

According to the present disclosure, the amphiphobic coating is applied to the particulate by one or more of a variety of techniques well known to those of ordinary skill in the art including chemically coating the particulate by spraying, dipping or soaking the particulate in a liquid solution of the hydrophobic material, application of a sheet of film such as copolymerized polyvinylidene chloride (commercially available as Saran Wrap™) to essentially "shrink-wrap" the particulate and encapsulate it in a chemically desirable coating, fusing material to the particulate in a manner similar to that utilized to fuse toner in a laser printer by placing heated particulate into a fusible powder such as a glass frit or enamel which will bond to the particulate, electroplating using electrostatic techniques well known to those of ordinary skill in the art to transfer a coating material such as a less chemically reactive metallic layer to the particulate, plasma spraying, sputtering, fluidizing the particulate in a fluidized bed such as according to techniques described in U.S. Pat. No. 4,440,866, the entire disclosure of which is incorporated herein by reference, and powder coating. Those of ordinary skill in the art will recognize that other techniques may also be used to suitably apply a substantially uniform consistent coating to the particulate. Those of ordinary skill in the art will also recognize that the particulate may be coated with a solid coating, such as glass frit, high alumina clays or bauxites, metals, or other hydrophobic powders. Such coatings could be applied by spraying, tumbling, or other means known in the art for applying powder coatings.

In one or more exemplary embodiments, the proppant particulates can be coated with the amphiphobic material to reduce conductivity loss caused by fracturing fluids, to alter or modify proppant wettability, to control the relative permeability to flow of fluids, such as oil, gas, and water, which may be encountered in the reservoir, to "lubricate" the proppant to allow more efficient proppant arrangement when the fracture closes, and to reduce eventual scale buildup on proppant. In an embodiment, natural sands, manufactured proppants, and/or resin-coated materials are treated to reduce conductivity loss caused by fracturing fluids by saturating such proppant particulates with amphiphobic materials as described above. According to another embodiment, natural sands, manufactured proppants, and/or resin-coated materials are treated to alter or modify proppant wettability and consequently improve multiphase flow by coating the proppant materials with the amphiphobic materials described above. Thus, various embodiments disclosed herein relate to concepts and techniques to treat fracturing sand and/or proppant to: 1) reduce conductivity loss due to fracturing fluids, 2) alter or modify proppant wettability, to control the relative permeability to flow of the fluids which may be encountered in the reservoir (such as oil, water, gas, chemical treatments, and fracturing fluids), 3) "lubricate" the proppant to allow more efficient proppant arrangement when the fracture closes, effectively increasing packing efficiency and reducing the extent of proppant crushing, 4) reduce eventual scale buildup on proppant, and 5) reduce the chemical reactivity of proppant to materials encountered in the reservoir or well treatment, including but not limited to: oil, gas, water, brine, fracturing fluids, remedial acid treatments, caustic fluids commonly associated with steam or water injection, biological agents or their byproducts such as carbon dioxide and hydrogen sulfide.

Any one or more of these benefits can be achieved in a variety of ways, including but not limited to reducing chemical reactivity of the proppant by "treating," or coating, the proppant. In certain examples, treating the proppant includes applying a coating of the amphiphobic material onto the proppant. Thus, exemplary techniques for treating fracturing sand and/or proppant include but are not limited to modifying the wettability and fluid affinity of the proppant by applying a coating of the amphiphobic material onto the proppant. Exemplary techniques for treating proppant with amphiphobic coatings include: coating the proppant prior to the fracturing treatment; coating the proppant "on the fly" during the fracturing treatment; or, applying post-fracturing "squeeze" treatments in which an existing fracture and/or formation is contacted with amphiphobic material. Thus, exemplary techniques for treating proppant include but are not limited to: 1) pretreating proppant prior to the fracturing treatment, 2) treating proppant "on the fly" during the fracturing treatment, and 3) post-fracturing "squeeze" treatments in which an existing fracture and/or formation can be contacted with amphiphobic material to produce the above-mentioned benefits. The techniques for treating proppant are not limited to proppant type, and are applicable to natural sands, manufactured proppants, and resin-coated materials. In addition, a variety of chemicals, or "coatings", produce the desired effects.

When used as a proppant, the particles described herein can be handled in the same manner as ordinary proppants. For example, the particles can be delivered to the well site in bags or in bulk form along with the other materials used in fracturing treatment. Conventional equipment and techniques can be used to place the particles in the formation as a proppant. For example, the particles are mixed with a fracture fluid, which is then injected into a fracture in the formation.

In an exemplary method of fracturing a subterranean formation, a hydraulic fluid is injected into the formation at a rate and pressure sufficient to open a fracture therein, and a fluid containing sintered, substantially round and spherical particles prepared from a slurry as described herein and having one or more of the properties as described herein is injected into the fracture to prop the fracture in an open condition.

Exemplary embodiments of the present disclosure further relate to any one or more of the following paragraphs:

1. An amphiphobic proppant particle, comprising: a proppant particle having size from about 8 mesh to about 140 mesh and a density of less than about 4.0 g/cm$^3$; and a coating comprising an amphiphobic material formed on an outer surface of the proppant particle.

2. The amphiphobic proppant according to paragraph 1, wherein the proppant particle is selected from the group consisting of ceramic proppant, sand, plastic beads and glass beads.

3. The amphiphobic proppant particle according to paragraphs 1 or 2, wherein the amphiphobic material is selected from the group consisting of one or more fluorinated poly(acrylates), one or more fluorinated silanes, and one or more fluorinated siloxanes and any combination thereof.

4. The amphiphobic proppant particle according to any one of paragraphs 1 to 3, wherein the amphiphobic material is a fluorinated poly(acrylate).

5. The amphiphobic proppant particle according to paragraph 4, wherein the fluorinated poly(acrylate) comprises monomers selected from the group consisting of fluorohexyl acrylate, fluoroaryl acrylate, 2-(perfluorooctyl)ethyl acrylate, heptafluorobutyl acrylate, 1H,1H,9H-hexadecafluorononyl acrylate, 2,2,3,4,4,4-hexafluorobutyl acrylate, hexafluoroisopropyl acrylate, 1H,1H,5H-octafluoropentyl acrylate, pentafluorobenzyl acrylate, pentafluorophenyl acrylate, perfluorocyclohexyl methyl acrylate, perfluoroheptoxypoly(propyloxy) acrylate, perfluorooctyl acrylate, 1H,1H-perfluorooctyl acrylate, 2,2,3,3-tetrafluoropropyl acrylate, 2,2,2-trifluoroethyl acrylate, 3-(trifluoromethyl) benzyl acrylate, 2-(N-butylperfluorooctanesulfamido) ethyl acrylate, 1H,1H,7H-dodecafluoroheptyl acrylate, 1H,1H, 11H-eicosafluoroundecyl acrylate, trihydroperfluoroundecyl acrylate, trihydroperfluoroheptyl acrylate, and 2-(N-ethylperfluorooctane sulfamido) ethyl acrylate.

6. The amphiphobic proppant particle according to paragraph 4, wherein the fluorinated poly(acrylate) comprises a combination of repeating units derived from the monomer $C_6F_{13}CH{=}CHROCOCH{=}CH_2$, wherein R is selected from the group consisting of $CH_2$, $CH_2OCH_2CH_2$, and $(OCH_2CH_2CH_2)_{1.6}$.

7. The amphiphobic proppant particle according to any one of paragraphs 1 to 6, further comprising a hydrophobicity value as measured by a water droplet contact angle of at least about 90° and an oleophobicity value as measured by an oil droplet contact angle of at least about 90°.

8. The amphiphobic proppant particle according to any one of paragraphs 1 to 7, wherein the proppant particle has a size from about 20 to about 40 mesh.

9. The amphiphobic proppant particle according to paragraph 2, wherein the ceramic proppant has an alumina content of from about 40 wt % to about 55 wt % on a calcined basis.

10. The amphiphobic proppant particle according to any one of paragraphs 1 to 9, wherein a pack of the amphiphobic proppant particles, having a 20/40 mesh size range, have a long term permeability at 7,500 psi of at least about 10 D as measured in accord with ISO 13503-5.

11. An amphiphobic proppant pack, comprising: a plurality of amphiphobic proppant particles, each comprising a proppant particle having size from about 8 mesh to about 140 mesh and a density of less than about 4.0 g/cm$^3$ and a coating comprising an amphiphobic material formed on an outer surface of the proppant particle.

12. The amphiphobic proppant particle according to paragraph 11, wherein the proppant particle is selected from the group consisting of ceramic proppant, sand, plastic beads and glass beads.

13. The amphiphobic proppant pack according to paragraphs 11 or 12, wherein the amphiphobic material is a fluorinated poly(acrylate).

14. The amphiphobic proppant pack according to paragraph 13, wherein the fluorinated poly(acrylate) comprises monomers selected from the group consisting of fluorohexyl acrylate, fluoroaryl acrylate, 2-(perfluorooctyl)ethyl acrylate, heptafluorobutyl acrylate, 1H, 1H, 9H-hexadecafluorononyl acrylate, 2,2,3,4,4,4-hexafluorobutyl acrylate, hexafluoroisopropyl acrylate, 1H,1H,5H-octafluoropentyl acrylate, pentafluorobenzyl acrylate, pentafluorophenyl acrylate, perfluorocyclohexyl methyl acrylate, perfluoroheptoxypoly(propyloxy) acrylate, perfluorooctyl acrylate, 1H,1H-perfluorooctyl acrylate, 2,2,3,3-tetrafluoropropyl acrylate, 2,2,2-trifluoroethyl acrylate, 3-(trifluoromethyl) benzyl acrylate, 2-(N-butylperfluorooctanesulfamido) ethyl acrylate, 1H,1H,7H-dodecafluoroheptyl acrylate, 1H,1H, 11H-eicosafluoroundecyl acrylate, trihydroperfluoroundecyl acrylate, trihydroperfluoroheptyl acrylate, and 2-(N-ethylperfluorooctane sulfamido) ethyl acrylate.

15. The amphiphobic proppant pack according to paragraph 13, wherein the fluorinated poly(acrylate) comprises a combination of repeating units derived from the monomer $C_6F_{13}CH{=}CHROCOCH{=}CH_2$, wherein R is selected from the group consisting of $CH_2$, $CH_2OCH_2CH_2$, and $(OCH_2CH_2CH_2)_{1.6}$.

16. The amphiphobic proppant pack according to any one of paragraphs 11 to 15, further comprising a hydrophobicity value as measured by a water droplet contact angle of at least about 90° and an oleophobicity value as measured by an oil droplet contact angle of at least about 90°.

17. A method of fracturing a subterranean formation, comprising: injecting a hydraulic fluid into a wellbore extending into the subterranean formation at a rate and pressure sufficient to open a fracture therein; injecting into the fracture a fluid containing a plurality of amphiphobic proppant particles, each comprising a proppant particle having size from about 8 mesh to about 140 mesh and a density of less than about 4.0 g/cm$^3$ and a coating comprising an amphiphobic material formed on an outer surface of the proppant particle; and forming a proppant pack of the plurality of amphiphobic proppant particles inside the fracture.

18. The method according to paragraph 17, wherein the amphiphobic material is a fluorinated poly(acrylate).

19. The method according to paragraph 18, wherein the fluorinated poly(acrylate) comprises a combination of repeating units derived from the monomer $C_6F_{13}CH\!=\!CHROCOCH\!=\!CH_2$, wherein R is selected from the group consisting of $CH_2$, $CH_2OCH_2CH_2$, and $(OCH_2CH_2CH_2)_{1-6}$.

20. The method according to any one of paragraphs 17 to 19, wherein the proppant pack comprises a hydrophobicity value as measured by a water droplet contact angle of at least about 90° and an oleophobicity value as measured by an oil droplet contact angle of at least about 90°.

While the present disclosure has been described in terms of several exemplary embodiments, those of ordinary skill in the art will recognize that embodiments of the disclosure can be practiced with modification within the spirit and scope of the appended claims.

The present disclosure has been described relative to a several exemplary embodiments. Improvements or modifications that become apparent to persons of ordinary skill in the art only after reading this disclosure are deemed within the spirit and scope of the application. It is understood that several modifications, changes and substitutions are intended in the foregoing disclosure and in some instances some features of the disclosure will be employed without a corresponding use of other features. Accordingly, it is appropriate that the appended claims be construed broadly and in a manner consistent with the scope of the disclosure.

What is claimed is:

1. An amphiphobic proppant particle, comprising:
   a proppant particle having an internal interconnected porosity from about 5% to about 75%, a size from about 8 mesh to about 140 mesh and a density of less than 4.0 g/cm³; and
   a degradable coating comprising an amphiphobic material infused into at least a portion of the internal interconnected porosity and formed on an outer surface of the proppant particle,
   wherein the degradable coating comprises a degradable polymer blended with the amphiphobic material.

2. The amphiphobic proppant particle of claim 1, wherein the amphiphobic material is selected from the group consisting of one or more fluorinated poly(acrylates), one or more fluorinated silanes, and one or more fluorinated siloxanes and any combination thereof.

3. The amphiphobic proppant particle of claim 1, further comprising a hydrophobicity value as measured by a water droplet contact angle of at least about 90° and an oleophobicity value as measured by an oil droplet contact angle of at least about 90°.

4. The amphiphobic proppant particle of claim 1, wherein the degradable coating comprises a polyvinyl alcohol.

5. The amphiphobic proppant particle of claim 1, wherein the proppant particle comprises 30 wt % to about 99.9 wt % alumina on a calcined basis and wherein the interconnected porosity is from about 20% to about 75%.

6. The amphiphobic proppant particle of claim 5, wherein when the degradable coating degrades, the amphophobic material infused into the internal interconnected porosity is released onto an outer surface of the amphiphobic proppant particle.

7. The amphiphobic proppant particle of claim 1, wherein the amphiphobic material is a fluorinated poly(acrylate).

8. The amphiphobic proppant particle of claim 7, wherein the fluorinated poly(acrylate) comprises monomers selected from the group consisting of fluorohexyl acrylate, fluoroaryl acrylate, 2-(perfluorooctyl)ethyl acrylate, heptafluorobutyl acrylate, 1H,1H,9H-hexadecafluorononyl acrylate, 2,2,3,4,4,4-hexafluorobutyl acrylate, hexafluoroisopropyl acrylate, 1H,1H,5H-octafluoropentyl acrylate, pentafluorobenzyl acrylate, pentafluorophenyl acrylate, perfluorocyclohexyl methyl acrylate, perfluoroheptoxypoly(propyloxy) acrylate, perfluorooctyl acrylate, 1H,1H-perfluorooctyl acrylate, 2,2,3,3-tetrafluoropropyl acrylate, 2,2,2-trifluoroethyl acrylate, 3-(trifluoromethyl)benzyl acrylate, 2-(N-butylperfluorooctanesulfamido) ethyl acrylate, 1H,1H,7H-dodecafluoroheptyl acrylate, 1H,1H,11H-eicosafluoroundecyl acrylate, trihydroperfluoroundecyl acrylate, trihydroperfluoroheptyl acrylate, and 2-(N-ethylperfluorooctane sulfamido) ethyl acrylate.

9. The amphiphobic proppant particle of claim 7, wherein the fluorinated poly(acrylate) comprises a combination of repeating units derived from the monomer $C_6F_{13}CH\!=\!CHROCOCH\!=\!CH_2$, wherein R is selected from the group consisting of $CH_2$, $CH_2OCH_2CH_2$, and $(OCH_2CH_2CH_2)_{1-6}$.

10. An amphiphobic proppant particle, comprising:
    a proppant particle having an internal interconnected porosity from about 5% to about 75%, a size from about 8 mesh to about 140 mesh and a density of less than 4.0 g/cm³; and
    an amphiphobic material infused into at least a portion of the internal interconnected porosity and formed on at least a portion of an interior pore wall of the proppant particle,
    wherein the amphiphobic material is blended with a degradable polymer.

11. The amphiphobic proppant particle of claim 10, wherein the interior pore wall has a hydrophobicity value as measured by a water droplet contact angle of at least about 90° and an oleophobicity value as measured by an oil droplet contact angle of at least about 90°.

12. The amphiphobic proppant particle of claim 10, wherein the amphiphobic material is a fluorinated poly (acrylate).

13. The amphiphobic proppant particle of claim 12, wherein the fluorinated poly(acrylate) comprises monomers selected from the group consisting of fluorohexyl acrylate, fluoroaryl acrylate, 2-(perfluorooctyl)ethyl acrylate, heptafluorobutyl acrylate, 1H,1H,9H-hexadecafluorononyl acrylate, 2,2,3,4,4,4-hexafluorobutyl acrylate, hexafluoroisopropyl acrylate, 1H,1H,5H-octafluoropentyl acrylate, pentafluorobenzyl acrylate, pentafluorophenyl acrylate, perfluorocyclohexyl methyl acrylate, perfluoroheptoxypoly (propyloxy) acrylate, perfluorooctyl acrylate, 1H,1H-perfluorooctyl acrylate, 2,2,3,3-tetrafluoropropyl acrylate, 2,2,2-trifluoroethyl acrylate, 3-(trifluoromethyl)benzyl acrylate, 2-(N-butylperfluorooctanesulfamido) ethyl acrylate, 1H,1H,7H-dodecafluoroheptyl acrylate, 1H,1H,11H-eicosafluoroundecyl acrylate, trihydroperfluoroundecyl acrylate, trihydroperfluoroheptyl acrylate, and 2-(N-ethylperfluorooctane sulfamido) ethyl acrylate.

14. The amphiphobic proppant particle of claim 12, wherein the fluorinated poly(acrylate) comprises a combination of repeating units derived from the monomer $C_6F_{13}CH\!=\!CHROCOCH\!=\!CH_2$, wherein R is selected from the group consisting of $CH_2$, $CH_2OCH_2CH_2$, and $(OCH_2CH_2CH_2)_{1-6}$.

* * * * *